United States Patent [19]

Cheek et al.

[11] Patent Number: 4,658,933

[45] Date of Patent: Apr. 21, 1987

[54] UNIVERSAL HOIST ADAPTOR

[75] Inventors: Thomas L. Cheek, Anaheim; Joe G. Schoolcraft, Westminster, both of Calif.

[73] Assignee: Knowles Chemical Corporation, Canyon Lake, Calif.

[21] Appl. No.: 680,019

[22] Filed: Dec. 10, 1984

[51] Int. Cl.[4] .................... B60S 13/00

[52] U.S. Cl. .................... 187/8.67; 187/8.75; 254/2 B

[58] Field of Search .................... 187/8.41, 8.43, 8.45, 187/8.74, 8.67, 8.75; 254/2 R, 2 B, 2 C

[56] References Cited

U.S. PATENT DOCUMENTS

| | | | |
|---|---|---|---|
| 2,949,978 | 8/1960 | Halstead | 187/8.74 |
| 3,250,346 | 5/1966 | Swick, Jr. | 187/8.67 |
| 3,330,382 | 7/1967 | Carlson | 187/8.75 |

*Primary Examiner*—H. Grant Skaggs
*Assistant Examiner*—Kenneth Noland
*Attorney, Agent, or Firm*—Nilsson, Robbins, Dalgarn, Berliner, Carson & Wurst

[57] ABSTRACT

A universal adaptor is attached to the top end of a hydraulic ram of a vertical hoist for accomodating the lifting of motor vehicles for servicing. The adaptor has retractable traction pads at either end of an elongated support platform which engage the lower shock absorber tower mounts on opposing sides of the underside of the vehicle. The adaptor also includes axle lift cradles which may be engaged to support a vehicle by its rear axle or may be disengaged when their use is not feasible, such as lifting vehicles having independent rear wheel suspension systems. The retractable pads are retained in discrete positions by a latching mechanism, being adjustable to accommodate a variety of vehicular undersides of differing lateral dimensions.

7 Claims, 4 Drawing Figures

FIG. 1
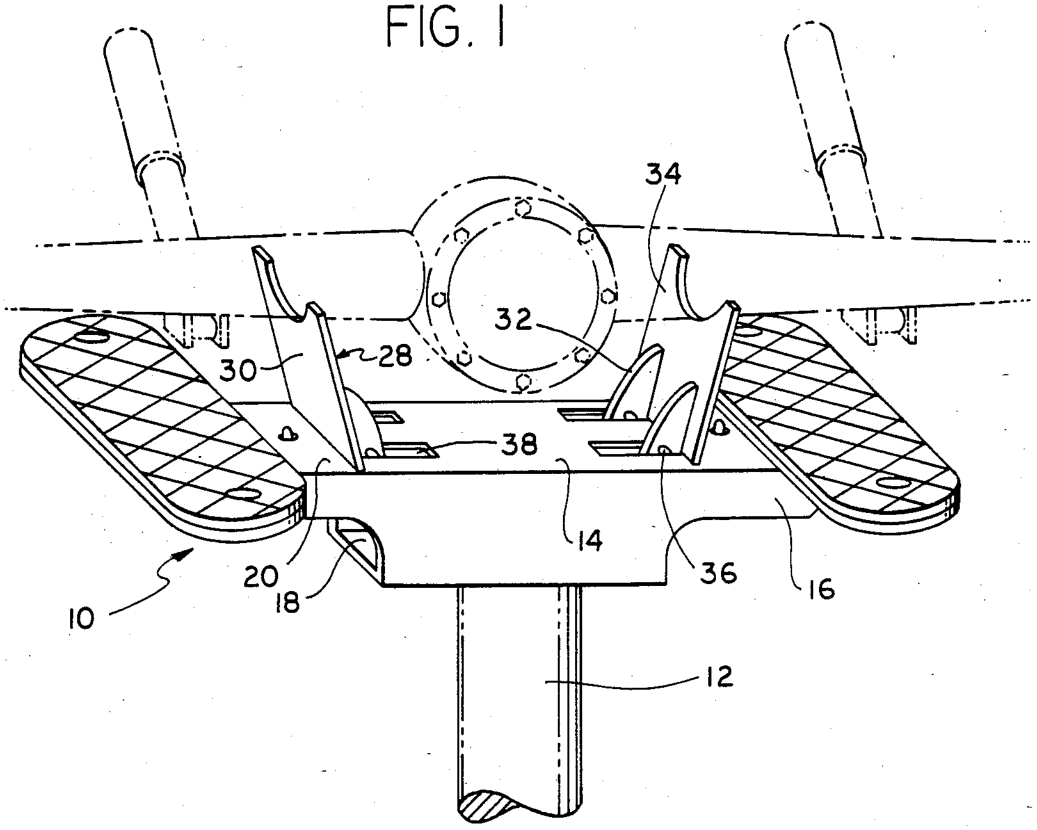
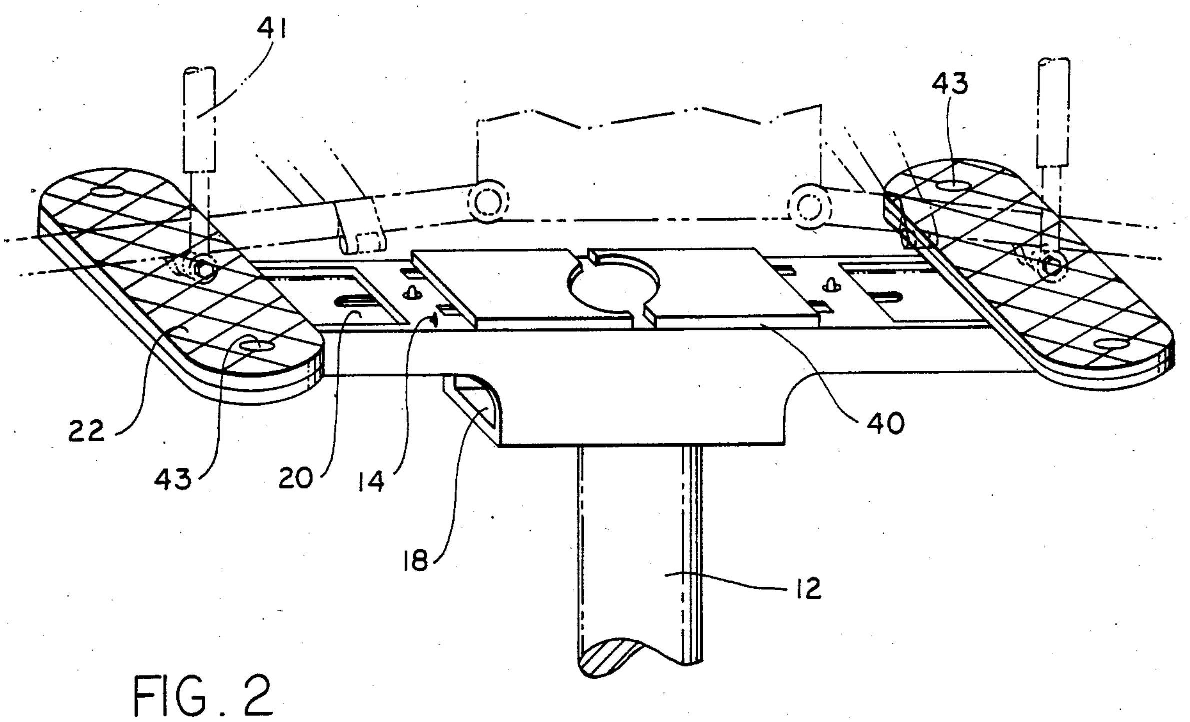
FIG. 2

UNIVERSAL HOIST ADAPTOR

FIELD OF THE INVENTION

This invention relates to adaptors for attachment to the top of a hydraulic ram of a vertical lift for aiding in the lifting of vehicles by the underside for servicing. More specifically, this invention relates to universal adaptors for attachment to hydraulic rams with retractable axle lift cradles and adjustable traction pads to engage the vehicular underside at various discrete locations to accomodate a variety of vehicles.

BACKGROUND OF THE INVENTION

Servicing of motor vehicles often requires that the mechanic perform his duties on the exposed underside of the vehicle. Service stations use hoists to lift vehicles for maintainance and repair. Vertical hoists are used to raise vehicles from underneath to selected positions above ground level. Such hoists generally are comprised of one or two hydraulic cylinder rams which move along their central axis longitudinally up and down to raise and lower the vehicle. Positioned on top of the hydraulic ram or rams is a support platform mechanism for engaging the underside of the motor vehicle and lifting the vehicle above ground.

The single ram hoist may appear generally in at least two embodiments. The first version is a single ram positioned to be placed below the center of the motor vehicle, with at least four pivotable spider arms with pads for engaging the outer frame or axles of the vehicle. An alternative single ram hoist is one which also is positioned central under the vehicle, having a secured pair of running tracks lying in a rigid horizontal frame which the vehicle drives along and which lifts the vehicle by its tires or frame. The advantages of the first embodiment are that one can adjust the location of the spider arms to engage the frame of vehicles designed for frame lift and engage axles or suspension mounts of those vehicles with unibody construction designed for lifting off the frame. The running track ram lift supports the automobile or truck as it usually supports itself, by the tires, axles and suspension system of the vehicle. A disadvantage of both systems is that distribution of the load of the vehicle is unevenly translated to the center pole hydraulic ram, since, in front engine cars, for example, the bulk of the weight is in front. This could cause a build-up in compressive loads in parts of the vehicle which would be structurally damaging. Additionally, certain types of servicing is best provided when the tires swing free. This is difficult to accomplish with a running track support mechanism.

Two ram hydraulic lifts positioned center front and rear below the respective front and rear tire axis laterally disposed across the width of the vehicle serve to distribute load by dividing the compressive force front and rear. One embodiment of a two ram hoist is a single frame running tracks which is secured atop the front and rear rams and functions like the single ram with running track frame construction. Although force distribution is improved over the single ram construction, the running track may not be adjusted to engage a variety of vehicles and relies on the tires.

An alternative embodiment of the twin ram hoist conventionally has two separate support platforms, one atop each ram, front and rear, having a fixed axle cradle for lifting the vehicle by its front and rear axle. The axle cradles allow the vehicle to be supported while the tires swing free and to distribute the weight of the vehicle independently front and rear. This embodiment also avoids lifting a vehicle by its outer frame preventing vehicular structural damage.

Beginning in the 1970's, more vehicles have been designed with four wheel independent suspension systems. Independent suspension has resulted in designs which remove the rear axle in some systems. Four wheel independent suspension have shock tower control arms on the rear system which may trail or which lead off center from an axis running through the center of the rear tires across the vehicle.

The twin ram fixed axle cradle lift design of the conventional art presupposed the existence of front and rear axles. For servicing vehicles of four wheel independent suspension system design, a newer design is required which comprehends the fact that the rear end support mechanism has no rear axle to engage.

One solution to this problem is the conventional design of the "Weaver" adaptor tire lift. The rear support mechanism is a platform upon which the rear tires ride. In this manner, the rear end of a vehicle, lacking a rear axle, may be hoisted. Although this design for a rear support platform so1ves the problem of rear vehicular engagement where the vehicle has no rear axle, lifting by rear tires may limit servicing versatility since the tires do not swing free. Furthermore, if the front axle is engaged by a front axle cradle mount, while the rear wheels are supported by the rear "Weaver" adaptor support platform, the front ram would be raised higher than the rear ram in order for the vehicular underside to be supported parallel to the ground.

Furthermore, there may be an uneven distribution of load where the vehicular front end is supported by the front axle while the rear end is supported by its tires.

In order to properly service 4-wheel independent suspension vehicles, there is needed a twin ram vertical hoist support mechanism which will lift the rear underside of a variety of vehicles, some having rear axles and others not. The support mechanism must provide a sturdy engagement of the vehicle while allowing the tires to swing free The support mechanism must suspend the vehicle in the air parallel to the ground so that the front and rear hydraulic rams may be equally extended for maximum service.

SUMMARY OF THE INVENTION

The present invention is a universal adaptor for attachment atop at least one hydraulic ram of a vertical hoist for lifting a motor vehicle by its underside for servicing and maintaining the vehicle. The adaptor is an elongated support platform mechanism which has a set of traction pads, one at each end, which may be longitudinally adjusted to engage a variety of vehicular widths. The pads engage the vehicle at the shock absorber support mounts where the vehicle has independent suspension. The retractable pad adjustment mechanism is secured in place by a latching mechanism for retaining the variable positioning of the pads. The traction pads are designed of a resilient material such as neoprene which prevents slippage of the vehicle.

Additionally, the universal adaptor support platform provides axle lift cradles for supporting the underside of a vehicle by its axle, where the vehicle has a fixed rear axle, and adjustable mechanism for disengaging the axle lift cradles where servicing requires use of the traction pads.

The axle lift cradle may be disengaged by integrally securing cradle support plates to a pair of gussets disposed perpendicular to the cradle plates, the gussets secured to and forming a yoke about a pivot-pin. The pivot pin is laterally disposed across the support platform housing and secured to the longitudinal walls of the support platform by angle bars which hold the pivot-pin in place allowing the pin to rotate on its axis in a fixed position.

The support platform may be a generally open-ended box formed by arcuately truncated flanges which extend downwardly from the support platform surface to form walls along the longitudinal axis of the platform defining the support platform housing for the latching mechanism and the pivot-pin of the axle lift cradle disengagement mechanism.

A preferred embodiment of the latching mechanism for securing the adjustable position of the traction pads includes an actuator shaft mounted mid-point of a pawl bar and generally perpendicular to the surface of the support platform, having a free distal end which protrudes through an aperture defined on the surface of the platform and a proximal end mounted on the pawl bar. The pawl bar is confined between notches of opposing toothed racks, the toothed racks being disposed against opposing longitudinal walls of the housing and integral with a guide plate which can move a defined distance longitudinally telescoped inside the walls of the housing. When the actuator is pushed inward into the housing, the pawl bar clears the notches of the toothed rack walls, allowing the guide plate longitudinal motion. Also secured to the pawl bar along its length and orthogonal to the actuator shaft is a tongue plate, which is secured at its proximate end to the pawl bar and secured to a spring or other biasing mechanism at its distal end, such that the spring acting against the tongue plate biases the pawl bar downward into the toothed rack wall notches, so that the bar tends to remain in a locked position unless the actuator is pushed into the housing. The guide plate is integrally mounted to the traction pad arms, so that motion of the toothed rack walls and guide plates allows extension or retraction of the traction pads.

An alternative embodiment of the latching means is a set of elongated traction pad arms, each arm having a traction pad integrally mounted on top of the arm, and each arm being independently adjustable along the longitudinal axis of the support platform housing, telescoped within the housing. Each arm defines a row of lengthwise spaced apertures, positioned to coincide with a like row of apertures along either end of the support platform, so that the traction pad arms and support platform may be in registration, allowing a fastener such as a bolt, clip or screw, to be placed through coincident apertures for securing the traction pad arms in place at each end of the support platform.

The neoprene material supplies traction for the traction pads which prevent the underside of the vehicle from slipping at the engaged shock absorber tower mounts. The traction pads are secured to the arms by epoxy glue or flat-headed rivets.

BRIEF DESCRIPTION OF THE DRAWINGS

FIG. 1 is a perspective view of the universal hoist adaptor of the invention as mounted atop a hydraulic ram of a vertical hoist, with axle cradles extended, supporting the fixed rear axle of the motor vehicle.

FIG. 2 is a side perspective view of the universal hoist adaptor with axle cradles disengaged and traction pads supporting the underside of a motor vehicle at the shock absorber tower mounts.

DETAILED DESCRIPTION OF THE PREFERRED EMBODIMENT

Figure 3:
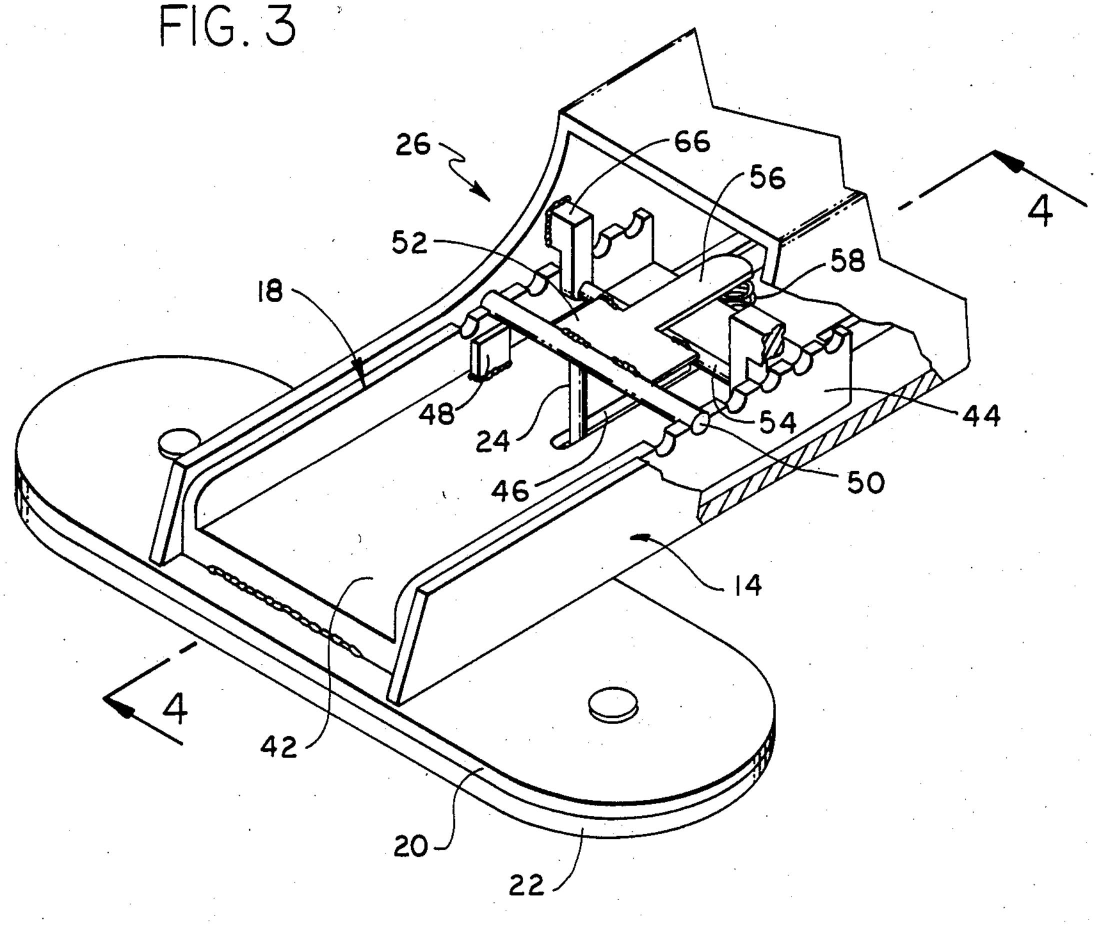
FIG. 3 is a fragmentary perspective view of the underside of the universal hoist adaptor revealing a preferred embodiment of the latching mechanism.
Figure 4:
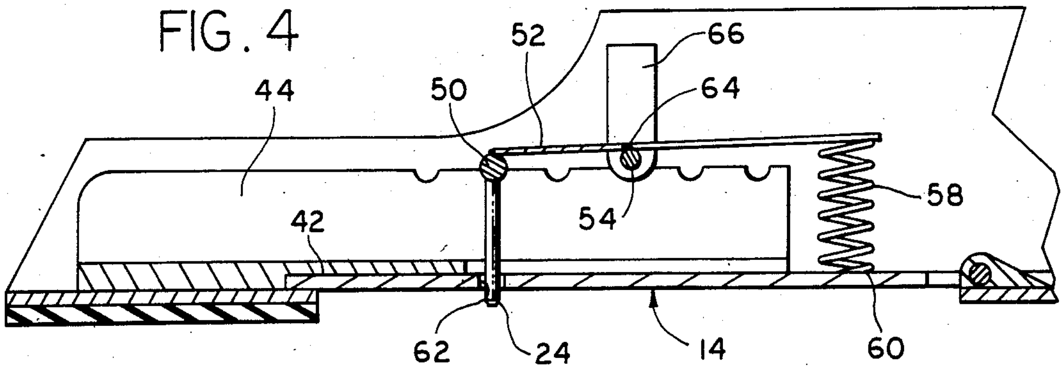
FIG. 4 is a side view of the underside of the universal hoist adaptor showing the latching mechanism along line 4—4 of FIG. 3.

Referring to FIG. 1, the universal hoist adaptor is shown generally at 10 and is secured atop a hydraulic ram 12 of the vertical hoist system. An elongated support platform 14 having arcuately truncated flanges 16 forms a box-like frame which defines a housing 18. Traction pad arms 20, integral with traction pads 22 positioned at opposing ends of the adaptor 24, are telescoped within the housing 18 of the elongated support platform 14. The arms 20 are longitudinally adjustable to accomodate a variety of lateral undersides of motor vehicles. A latching mechanism 26 (FIG. 3) includes an actuator bar 24 which protrudes above the surface of the platform and operates to secure the arms 20 in one of a number of discrete secure adjustable positions.

Axle lift cradles 28 are opposingly disposed at obtuse angles from planes parallel to the vertical axis of the ram 12. Axle lift cradle plates 30 are concave at the top for engaging fixed axles of vehicles which have fixed rear axles. A pair of gussets 32 orthogonal to the surface of the cradle plates are secured on one leg at 34 to the plates and at the bottom of the gusset 32 integrally mounted to a pivot-pin 36 as a yoke, about pin 36, pivot-pin 36 being laterally disposed within the housing 18 of the platform 14.

The pivot-pin 36 rotates about a fixed position, secured in place by opposing angle bars within the housing 18 (not shown). As the pivot-pin 36 rotates, the gussets rotate about the longitudinal axis of the pin 36, and cause the axle cradle plates 30 to rotate, so that the axle cradles 28 may be engaged under an axle when needed, and disengaged when vehicular support is provided by the traction pads 22. The axle cradles 28, in conjunction with the gussets 32 and pivot-pin 36, provide support by compressive load, as illustrated in FIG. 1. The gussets 32 serve to reinforce the primary compressive support which the cradle plates provide. The gussets 32 retire into slotted apertures 38 define by the surface of the platform 14, allowing the cradle plates 30, to lie flat atop the platform surface at 40. In an alternative embodiment, not illustrated, the axle cradles may be portably secured to a fixed non-rotating pivot-pin, snapped on and off for removal and engagement according to conventional methods. The ability to engage or disengage the axle cradles gives the adaptor the universality desired to accommodate the lifting of rear axle and independent suspension vehicles. This ability to alternate between the traction pad 22 and the axle cradle 30 support is an important feature of the adaptor. As noted, the box shaped housing encloses and protects the axle cradle pivot-pin and gusset assembly and the latching mechanism for the traction pads. The longitudinal flanges 16 are arcuately truncated in order to be received by a floor chamber having slots thereby allowing the platform to recede into the floor so that an automobile may drive over the platform.

FIG. 2 shows the traction pads 22 engaging the lower portion of the shock towers at the shock absorber support mounts 41 at either side of the underside of the vehicle, in order to lift the vehicle, such as a rear axleless 4-wheel independent suspension vehicle. The traction pads are made from a resilient neoprene rubber material which acts to prevent the car from accidently falling off the lift when it is suspended in the air. The neoprene traction pads 22 are bonded by an epoxy and held in place by a flat head rivet or bolt 43 at each end. The traction pads 22 are designed to be substantially elongated to allow flexible engagment of a variety of shock tower mounts of independent suspension systems, such as leading or trailing link systems. FIG. 2 is illustrative of the configuration assumed by disengaged axle cradles 28 lying flat against the top 40 of the support platform. As shown, the position of the traction pads 22 are independently adjustable along the length of the platform, between discrete latched positions for accommodating a variety of vehicular widths.

FIG. 3 is a view of the underside of the platform housing, revealing a preferred latching mechanism. Traction pad arm 20 is mounted atop the support platform surface 14 integral with the guide plate 42. Guide plate 42 is integral with each inner toothed rack wall 44, so that longitudinal movement of the guide plate moves the traction pad arm and the inner toothed rack walls. The guide plate 42 has a slot 46 which forms an open-ended channel about the actuator shaft 24 to allow movement extending the longitudinal position of the pad arm but restrictive of the distance retracted. The construction of the guide plate 42, as integral linkage between the toothed rack walls 44 and the traction pad arms 20, assures that fixing the position of the toothed rack wall 44 secures the position of the traction arm.

The guide plate 42 and the toothed rack walls 44 form a structure which is telescoped within the housing 18 of the adaptor. This insures uniform movement in a longitudinal direction only within the housing. Guide post 48 aids in preventing lateral movement of the guide plate 42.

The actuator shaft 24 moves generally in a direction orthagonal to the surface of the support platform 14 and guide plate 42. The distal end of the actuator 24 hangs freely through a slot on the surface of the platform and another slot 46 centered in the guide plate. The proximal end of the actuator 42 is integrally welded to the underside mid-point of pawl bar 50. Pawl bar 50 is disposed across the width of the guide plate 42 and is cradled between opposing toothed rack walls 44, secured within the notches of the toothed rack walls 44. The actuator shaft 24, when pressed against the pawl bar 50, raises the pawl bar 50 above the notches of the toothed rack walls 44, allowing the walls 44 and the guide plate 42 to move along the length of the platform thereby adjusting the position of the traction pads 22, for retraction or extention. A tongue plate 52, generally rectangular in shape, is welded or otherwise integrated along its opposing sides to the length of the pawl bar 50 and the length of the pivot rod 54 An elongated tongue 56 extends from mid-point of the pivot rod 50 inwardly to the housing, having its distal end affixed atop a biasing mechanism 58, which may be a mechanical coil spring. The biasing mechanism 58 is affixed to the inner wall at 60 of the support platform 14. The biasing mechanism acts to produce a force lifting tongue 56 of the tongue plate 52, forcing the pawl bar 50 down into the notches of the toothed rack walls 44 and causing the actuator shaft 24 to protrude through aperture 62 and above the surface of the support platform 14. Pivot rod 54 is secured in place by fulcrum 64, disposed at symetrically opposing recesses within fixed handle bars 66. In operation, by pressing the actuator shaft 24 into the support platform body, the pawl bar 50 is raised above the notches of the toothed rack walls 44 with clearance sufficient to allow movement of the traction pads 22 for extention or retraction. As the pawl bar 50 is raised, the tongue plate 52 pivots about the pivot rod 54, causing the tongue 56 to impart compression on biasing mechanism 58. The toothed rack walls 44 are moved to place a new set of notches below the raised pawl bar 50. As the actuator shaft 24 is released, the biasing mechanism 58 exerts a force on the tongue 56 which causes the tongue plate 52 to pivot about the pivot rod 54 pressing the pawl bar 50 securely into a new set of notches of the toothed rack walls 44. In this manner, the traction pad arms 20 may be adjusted without the use of independent fastening means.

In an alternative embodiment (not pictured) the traction pad arm is telescoped within the support platform. The end portions of the support platform each define a row of apertures running along the center length of the platform. The distal end of each traction arm has a row of apertures which are coincident with those on the platform surface. By placing the arm and platform in registration relationship, a fastener pin may be used to secure the arm to a selected adjustable position.

It should be noted that the preferred embodiment is illustrative of a universal hoist adaptor. The scope of the invention is not necessarily limited to the preferred embodiment. Many structural changes are possible and those changes are intended to be within the scope of this disclosure. For example, the toothed rack could be integral with the traction pad arm but not the guide plate. A movable rack so configured with the traction pad could function equivalent to the preferred latching mechanism, even if the guide plate were stationary. Consequently, the specific structural and functional details of the adaptor are merely representative, yet they are deemed to afford the best embodiment for purposes of disclosure and for providing support for the claims which define the scope of the present invention.

What is claimed is:

1. A universal adaptor for attachment atop at least one hydraulic ram of a vertical hoist for lifting a motor vehicle across the underside of the vehicle comprising:

- an elongated support platform having a traction pad at each end for supporting the underside of the vehicle at the shock absorber support mounts and attachable to the top of the hydraulic ram;
- latching means for adjusting longitudinally the positions of the traction pads to accommodate a variety of vehicle undersides;
- axle lift cradles which are separate and distinct members than the traction pads, the axle lift cradle are disposed on the support platform adjacent and between each of the traction pads and towards each end of the support platform for supporting the underside of the vehicle along at least one vehicular axle; and,
- means for disengaging the axle lift cradles so that alternatively the traction pads may be engaged to support the underside of the vehicle at the shock absorber support mounts.

2. A universal adaptor for attachment atop at least one hydraulic ram of a vertical hoist for lifting a motor vehicle across the underside of the vehicle comprising:

an elongated support platform having a traction pad at each end for supporting the underside of the vehicle at the shock absorber support mounts and attachable to the top of the hydraulic ram;

latching means for adjusting longitudinally the positions of the traction pads to accommodate a variety of vehicle undersides;

an axle lift cradle disposed towards each end of the support platform for supporting the underside of the vehicle along at least one vehicular axle;

means for disengaging the axle lift cradles so that alternatively the traction pads may be engaged to support the underside of the vehicle at the shock absorber support mounts; and the support platform is generally shaped as an open-ended box, formed by arcuately truncated flanges extending downwardly as walls along the longitudinally axis of the platform, for defining a housing for the latching means and the means for disengaging the axle lift cradles.

3. A universal adaptor as in claim 2 wherein the latching means for adjusting the position of the traction pads includes:

a set of slidably adjustable elongated traction pad arms, each arm being integral with a traction pad at one end and being movable longitudinally and telescoping along the inside walls of the housing of the support platform; the arms having a first row of apertures which are positioned to coincide with a second row of apertures lying along the longitudinal axis of the surface of the support platform; and, and further having fastener means which are placed through at least one set of alligned first row apertures and second row apertures, in a registration relationship, to secure the positioning of the traction pad in a fixed and stationary position.

4. A universal adaptor as in claim 2 wherein the latching means for adjusting the position of the traction pads includes:

an actuator shaft mounted mid-point of a pawl bar and generally perpendicular to the surface of the support platform with a free distal end to register with at least a first aperture and pertrude through another second aperture located along the surface of the platform;

the proximal end of the shaft mounted on the pawl bar and perpendicular to a tongue plate mounted on the pawl bar;

the tongue plate pivoting about an elongated pivot rod, secured in place by fulcrum means;

the pawl bar movable along the longitudinal axis of the platform, for selective positioning among a plurality of notches of opposing toothed rack walls;

the pawl bar, tongue plate and actuator shaft being biased by a biasing means in a generally locking position securing the pawl bar at a discrete position at one set of the toothed rack wall notches; and, a guide plate integrally mounted between the rack walls and each wall and the plate connected to a traction pad arm, the arm movable longitudinally and telescoping within the housing and defining a channel about the proximate end of the activator shaft, for positioning the traction pad arm in relation to the position of the hand.

5. A universal adaptor as in claim 4 wherein the traction pads are neoprene rubber pads bonded and fastened securely to each of the traction pad arms.

6. A universal adaptor as in claim 2 wherein the means for disengaging the axle lift cradles includes an elongated laterally disposed pivot-pin secured below the surface of the support platform within the housing by angle bars integrally secured to the opposing longitudinal walls of the housing so that the pivot-pin may rotate about its longitudinal axis; and, a pair of cradle support plates for engaging at least one axle of the vehicle at each end of the support platform; a pair of gussets, mounted in planes perpendicular to the support plate, integral to the plate surface and surrounding the pivot-pin as a secure collar, so that rotation of the pivot-pin will rotate the gussets and pull the plate rotationally between two positions, a first position upright for engaging the vehicular axle and a second position retracted so that the plate will lie atop the platform and allow the pads to support the vehicle.

7. A universal adaptor for attaching to at least one hydraulic ram of a vehicular hoist for lifting a motor vehicle above the ground for servicing, comprising:

an elongated support platform having an open-ended generally box-like casing along the longitudinal axis of the platform, for disposition across the width of the vehicle and attachable to the top of the hydraulic ram, having at least a slot disposed about the middle of the platform extending longitudinally and openings at either end of the platform on the upper surface of the platform;

at least a pair of axle lift cradles, each cradle having a cradle support plate defining an upper concave surface for mountably supporting at least one motor vehicle axle, a pair of gussets, perpendicular to the cradle support plate and securely fastened to the plate and forming a yoke about a pivot-pin so that the cradle support plate can rotate about the pivot-pin between a first position upright for supporting an axle of the motor vehicle and a second position of disengagement lying flat on top of the surface of the support platform; and, a set of traction pad arms, each arm having an integrally mounted traction pad slidably engaging and telescoped within one at each end of the platform for longitudinal movement of the arms along the length of the platform, means for retraction of the arms securing the arms in registered allignment with the surface of the platform, so that the retraction means for adjusting the position of the traction pads may secure each of the traction pads in position to accommodate engagement with the shock absorber mounts of the underside of the motor vehicle.

* * * * *